United States Patent
Mittler et al.

(10) Patent No.: US 10,416,531 B2
(45) Date of Patent: Sep. 17, 2019

(54) COMPONENT SHIFTING APPARATUS WITH SHAPE MEMORY ALLOY ACTUATORS

(71) Applicant: NEWPORT CORPORATION, Irvine, CA (US)

(72) Inventors: Kay Mittler, Falkensee (DE); Olaf Spieweg, Berlin (DE); Dennis Grunow, Michendorf (DE)

(73) Assignee: Newport Corporation, Irvine, CA (US)

( * ) Notice: Subject to any disclaimer, the term of this patent is extended or adjusted under 35 U.S.C. 154(b) by 0 days.

(21) Appl. No.: 16/066,330

(22) PCT Filed: Dec. 30, 2015

(86) PCT No.: PCT/US2015/068076
§ 371 (c)(1),
(2) Date: Jun. 27, 2018

(87) PCT Pub. No.: WO2017/116437
PCT Pub. Date: Jul. 6, 2017

(65) Prior Publication Data
US 2019/0004395 A1    Jan. 3, 2019

(51) Int. Cl.
| | |
|---|---|
| G02F 1/35 | (2006.01) |
| C22C 38/42 | (2006.01) |
| C22C 38/44 | (2006.01) |
| C22F 1/00 | (2006.01) |
| F03G 7/06 | (2006.01) |
| G02F 1/355 | (2006.01) |

(52) U.S. Cl.
CPC ............ *G02F 1/3501* (2013.01); *C22C 38/42* (2013.01); *C22C 38/44* (2013.01); *C22F 1/006* (2013.01); *F03G 7/065* (2013.01); *G02F 1/3525* (2013.01); *G02F 1/3551* (2013.01); *C21D 2201/01* (2013.01); *G02F 2001/3505* (2013.01)

(58) Field of Classification Search
CPC .... G02F 1/3501; G02F 1/3505; G02F 1/3525; G02F 1/353; G02F 1/3551; G02F 2001/3505; C22F 1/006; F03G 7/065; C21D 2201/01
See application file for complete search history.

(56) References Cited

U.S. PATENT DOCUMENTS

| | | | |
|---|---|---|---|
| 7,005,781 B2 * | 2/2006 | Smits ................ | G02B 26/0858 310/330 |
| 7,170,911 B2 | 1/2007 | Katsura et al. | |
| 7,792,163 B2 | 9/2010 | Nakayama et al. | |
| (Continued) | | | |

FOREIGN PATENT DOCUMENTS

| | | |
|---|---|---|
| JP | H04330426 A | 11/1992 |
| WO | WO 2011/032294 | 3/2011 |

*Primary Examiner* — Daniel Petkovsek
(74) *Attorney, Agent, or Firm* — BakerHostetler

(57) ABSTRACT

Systems and methods for shifting a position of one or more optical elements are disclosed. In an embodiment, a system may include a housing having a chamber formed therein, at least one non-linear crystal disposed in the chamber, the non-linear crystal configured to receive at least one incident signal and to convert a wavelength of at least a portion of the incident signal, and at least one shape memory alloy element disposed such that thermal or electrical energy applied to the shape memory alloy causes movement of the non-linear crystal.

6 Claims, 8 Drawing Sheets

(56) References Cited

U.S. PATENT DOCUMENTS

| | | | |
|---|---|---|---|
| 7,961,378 B2 | 6/2011 | Imai et al. | |
| 8,305,680 B2 | 11/2012 | Martinez et al. | |
| 9,482,928 B2 * | 11/2016 | Perkins | G02F 1/353 |
| 2007/0091943 A1 | 4/2007 | Brocklin et al. | |
| 2013/0014501 A1 | 1/2013 | Brammajyosula et al. | |

* cited by examiner

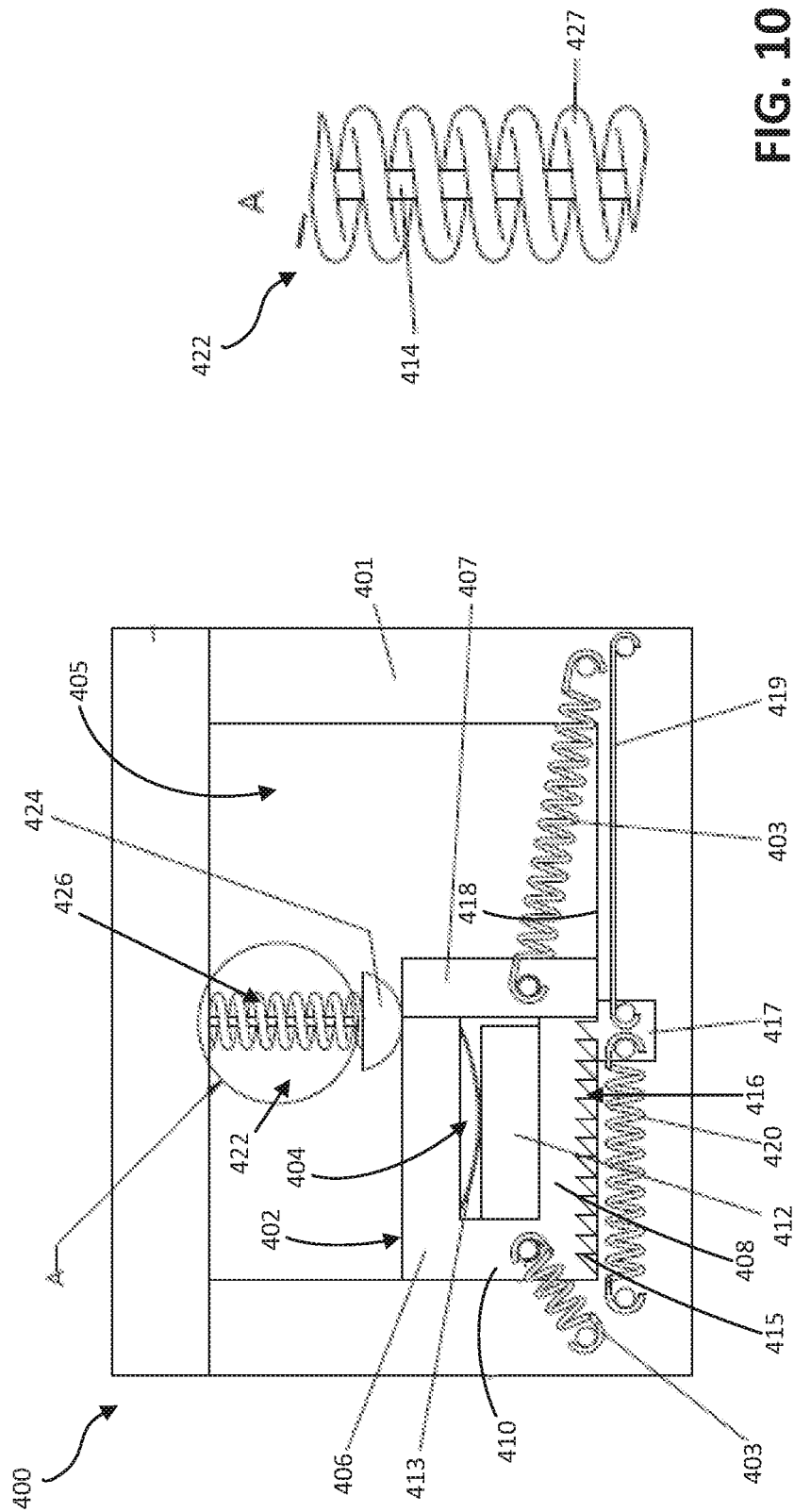

COMPONENT SHIFTING APPARATUS WITH SHAPE MEMORY ALLOY ACTUATORS

CROSS-REFERENCE TO RELATED APPLICATIONS

This application is the National Stage of International Patent Application No. PCT/US2015/068076, filed Dec. 30, 2015, the disclosure of which is incorporated herein by reference in its entirety.

TECHNICAL FIELD

This patent disclosure relates generally to a component shifting apparatus and, more particularly, to crystal shifters with shape memory alloy (SMA) actuators.

BACKGROUND

Laser systems and devices incorporating nonlinear optical crystals therein are presently used in a wide variety of applications. For example, nonlinear optical crystals are often used in converting laser light having a first wavelength to laser light having a second wavelength. Due to the limited lifetime of nonlinear crystals it is often necessary to shift a position of the nonlinear crystal (relative to the incident laser light) to a new position. Conventionally, actuators such as translation stages having motors (e.g., stepper motors, linear motors) are used to shift the position of the crystal.

While the use of conventional actuators has extended the lifetime of some nonlinear optical crystals, a number of shortcomings have been identified. For example, many conventional actuators contain organic and/or inorganic materials which may be outgassed during actuator use or over time. Laser-induced outgassing may contaminate the laser cavity, be deposited on one or more optics in the laser cavity or in an adjacent optical suite, and/or may compromise performance of the laser system.

In response, in some applications the actuators can be placed outside the crystal compartment and/or laser cavity, whereby mechanical feed-throughs allow interface between the actuator and the crystal. While positioning the actuators outside the crystal compartment and/or laser cavity may reduce or eliminate problems associate with laser-induced outgassing a number of shortcomings have been identified with this approach. For example, with time such feed-throughs can leak thereby allowing undesirable organic and/or inorganic materials to pass into the crystal compartment. In addition, these actuators may be used wherein space outside the laser system and/or cavity is extremely limited. As such, positioning an actuator outside the laser system and/or cavity may be difficult if not impossible.

In light of the foregoing, there is an ongoing need for an actuator which permits the controlled movement of an optical crystal positioned thereon while reducing or eliminating outgassing.

SUMMARY

In one aspect, the disclosure describes a system comprising: a housing having a chamber formed therein; a non-linear crystal disposed in the chamber, the non-linear crystal configured to receive at least one incident signal (e.g., light) and to convert the wavelength (and frequency) of at least a portion of the incident signal; and a shape memory alloy element disposed such that thermal or electrical energy applied to the shape memory alloy causes movement of the non-linear crystal.

In another aspect, the disclosure describes a system comprising: an outer housing defining a first chamber; an inner housing disposed in the first chamber, the inner housing defining a second chamber; a non-linear crystal disposed in the second chamber, the non-linear crystal configured to receive incident light and to convert a wavelength of at least a portion of the incident light; a piston disposed between the outer housing and the inner housing to limit movement of the inner housing relative to the outer housing, wherein the piston is configured to be actuated to allow movement of the inner housing relative to the outer housing; and a shape memory alloy element in mechanical contact with the inner housing, wherein thermal or electrical energy applied to the shape memory alloy causes movement of the inner housing.

In yet another aspect, the disclosure describes a system comprising: a first shifting apparatus having a housing; one or more first shape memory alloy elements disposed in the housing of the first shifting apparatus; at least one first plunger in mechanical communication with the one or more first shape memory alloy elements; and at least one non-linear crystal disposed on at least one translation stage, wherein the translation stage is configured to be engaged by the first plunger to cause the non-linear crystal to move, wherein the non-linear crystal is configured to receive incident light and to convert a wavelength of at least a portion of the incident light.

These and other aspects and features of the disclosure will be more readily understood upon reading the following description when taken in conjunction with the accompanying drawings.

BRIEF DESCRIPTION OF THE DRAWINGS

FIG. 9 is a schematic representation of a crystal shifter in accordance with another aspect of the present disclosure.

FIG. 10 is an enlarged view of a piston of the crystal shifter of FIG. 9.

DETAILED DESCRIPTION

Figure 1:
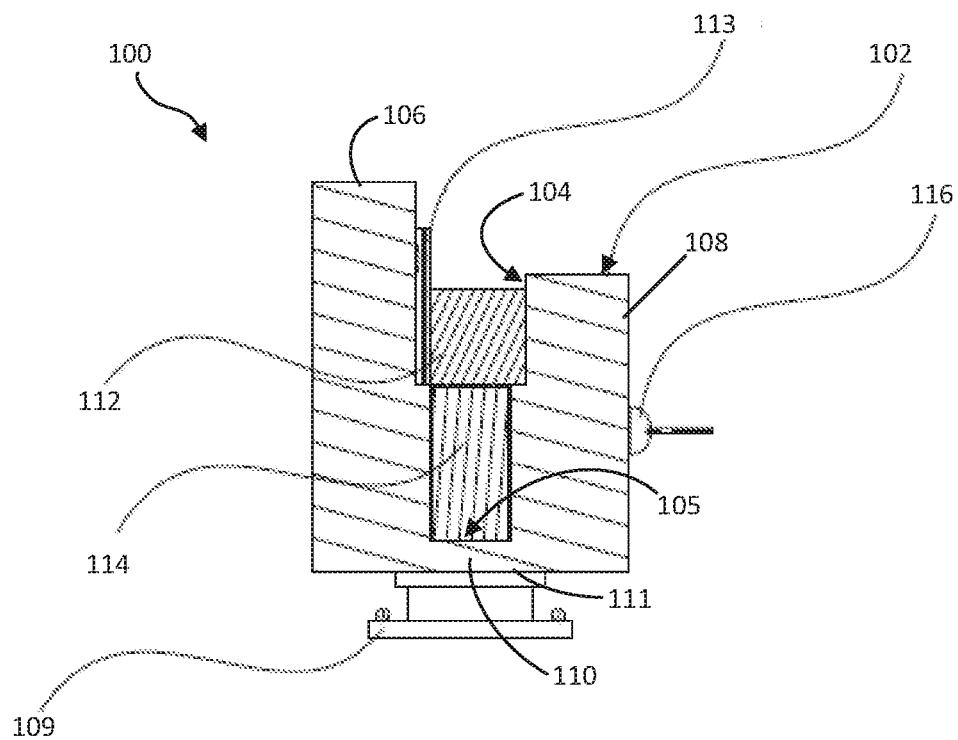
FIG. 1 is a cross-sectional view of a crystal shifter in accordance with an aspect of the present disclosure, shown with a non-linear crystal.
Figure 2:
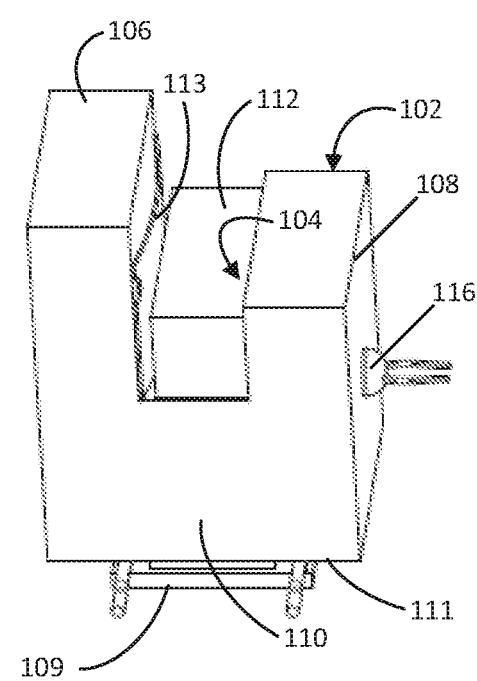
FIG. 2 is a perspective view of the crystal shifter of FIG. 1, shown with a non-linear crystal.
Figure 3:
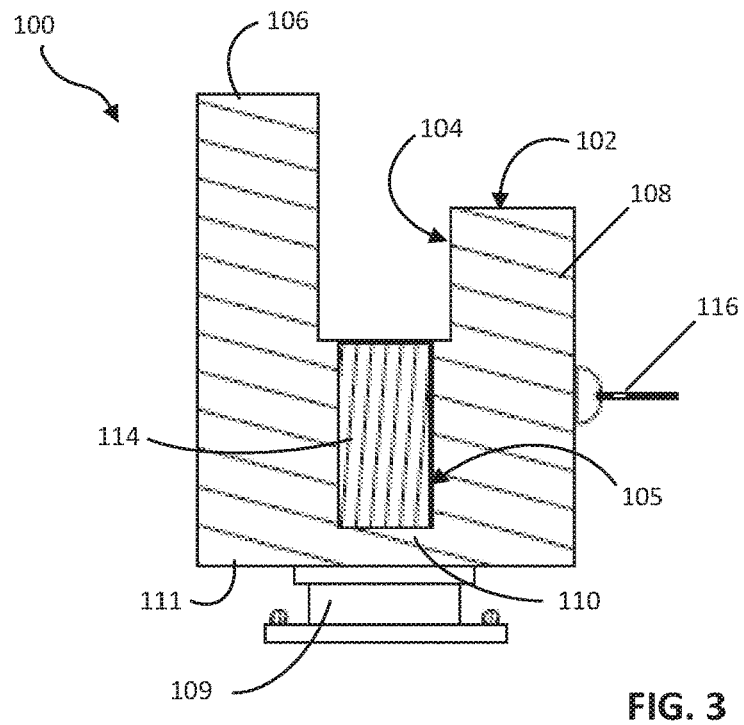
FIG. 3 is a cross-sectional view of the crystal shifter of FIG. 1, shown without a non-linear crystal.
Figure 4:
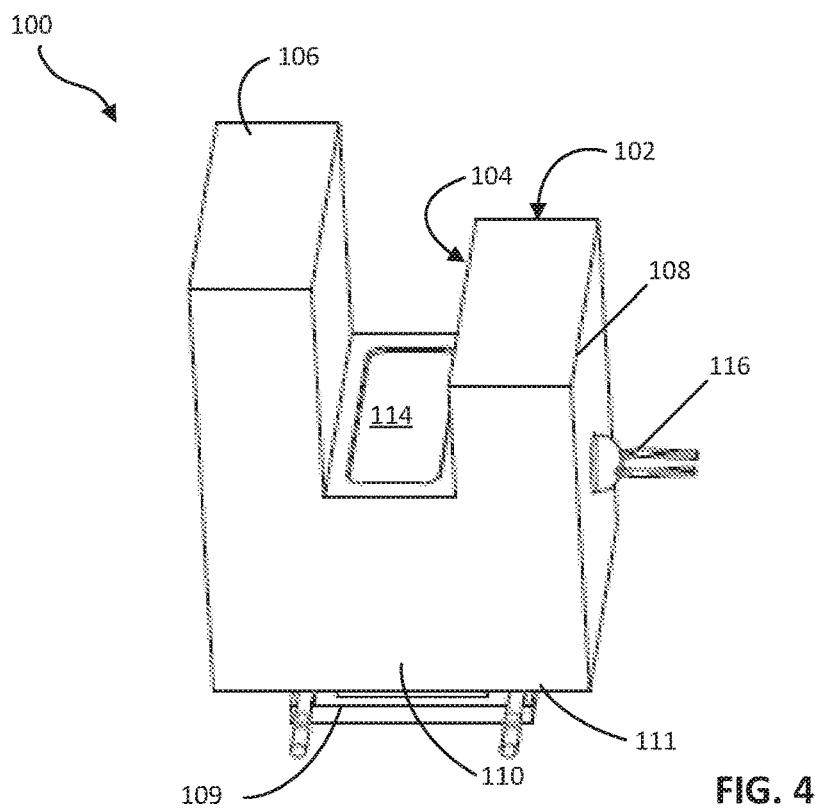
FIG. 4 is a perspective view of the crystal shifter of FIG. 1, shown without a non-linear crystal.

Now referring to the drawings, wherein like reference numbers refer to like elements, there is illustrated, in FIGS. 1-4, in one embodiment, the present application discloses a crystal shifter or component shifter 100 (hereinafter crystal shifter 100) configured to controllably support and position at least one optical crystal, component, and/or optical element or device. For example, in one embodiment, the crystal shifter 100 is configured to support a non-linear optical crystal configured to convert at least a portion of at least one incident signal, such as light (e.g., laser light), at a first wavelength to produce at least one output signal having at least a second wavelength. Other optical materials may be supported and positioned by the crystal shifter 100 such as periodically poled materials. In another embodiment, the crystal shifter 100 is configured to support and position at least one optical waveguide. Further, the crystal shifter 100 may be configured to support and selectively position any variety of optical components, or devices, including, without limitations, optical lenses, mirrors, gratings, waveguides, attenuators, filters, non-linear optical materials, optical crystals, beam splitters, bulk optical materials, gain media and devices, detectors, and the like.

Referring again to FIGS. 1-4, as illustrated, the crystal shifter 100 includes at least one housing such as a crystal oven 102 or temperature control mechanism. As shown, the crystal oven 102 includes at least a first chamber 104 formed therein, although those skilled in the art will appreciate that any number of chambers 104 may be formed in the crystal oven 102. In the illustrated embodiment, the crystal oven 102 has a generally "U" shaped configuration defined by a first wall 106, a second wall 108, and a trough portion 110 coupling the first wall 106 to the second wall 108. Optionally, other configurations and shapes may be used. The crystal oven 102 may include a second chamber 105 disposed adjacent the first chamber 104. As shown, the second chamber 105 may be formed in the trough portion 110 of the crystal oven 102 and the first chamber 104 and may be defined between the first wall 106 and the second wall 108. In certain aspects, at least one temperature controller 109 such as a thermoelectric cooler (TEC) may be in thermal communication (e.g., direct contact, indirect contact, etc.) with the crystal oven 102 and/or components disposed in or around the crystal oven 102. As an example, the temperature controller 109 is shown disposed adjacent a first (bottom) end 111 of the crystal oven 102. Other energy sources (e.g., thermal sources) may be included such as a resistive and/or inductive heaters.

At least one non-linear crystal 112 may be disposed in the first chamber 104. The non-linear crystal 112 may be capable of converting the wavelength of incident light, using, for example, harmonic conversion. As an example, the non-linear crystal 112 may be configured as a third harmonic generation crystal, although those skilled in the art will appreciate that wavelength conversion may be accomplished using any variety of techniques. For example, in an alternate embodiment, the non-linear crystal 112 comprises a second harmonic generation crystal, a fourth harmonic generation crystal, or an n+1 harmonic generation crystal. At least one biasing element 113 (e.g., spring, push spring, organic foam material, etc.) may be disposed adjacent the non-linear crystal 112 to provide a biasing force to the non-linear crystal 112. As an example, the biasing element 113 may be disposed between the non-linear crystal 112 and the first wall 106 to bias the non-linear crystal 112 toward the second wall 108. Other configurations may be used.

At least one shape memory alloy (SMA) element 114 may be disposed adjacent the non-linear crystal 112. As shown, the SMA element 114 may be disposed in the second chamber 105. A portion of the SMA element 114 may abut the non-linear crystal 112 such that movement of the SMA element 114 may cause movement of the non-linear crystal 112. The SMA element 114 is shown having a cuboid shape. However, other shapes and sizes may be used.

One or more sensors 116 may be disposed adjacent a portion (e.g., second wall 108) of the crystal oven 102 to measure a thermal property (e.g., temperature) of one or more of the crystal oven 102, the SMA element 114, and an environment adjacent the same. As an example, the sensors 116 may be a or comprise a thermistor such as a negative temperature coefficient sensor. However, other sensors and configurations may be used.

In operation, a voltage (or heat) may be applied to the SMA element 114 to cause a shape change (e.g., expansion, contraction, etc.) thereof. As the SMA element 114 changes shape, the non-linear crystal 112 is caused to move. In the example shown in FIGS. 1-4, an expansion of the SMA element 114 causes the non-linear crystal 112 to move away from the first end 111, overcoming friction between the biasing element 113 and the second wall 108. Control of the expansion of the SMA element 114 may allow positional shifting of the non-linear crystal 112 without the need for convention actuators with outgassing organics.

Figure 5:
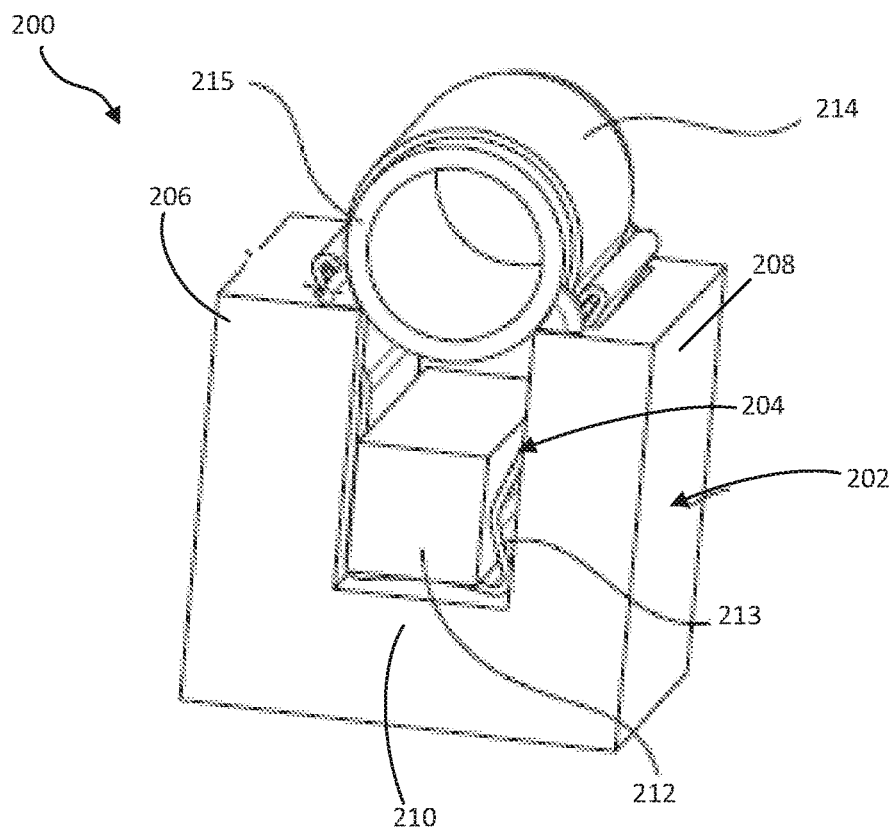
FIG. 5 is a perspective view of a crystal shifter in accordance with another aspect of the present disclosure.
Figure 6:
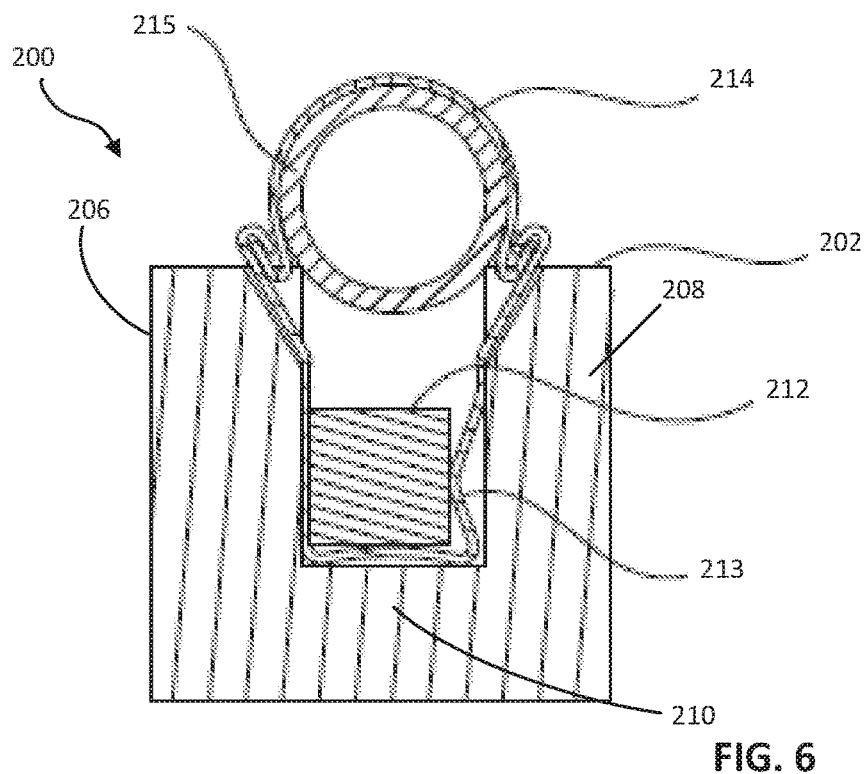
FIG. 6 is a cross-sectional view of the crystal shifter of FIG. 5.

FIGS. 5-6 shown another embodiment of a crystal shifter 200. As shown, the crystal shifter 200 includes a housing such as at least one crystal oven 202 or temperature control mechanism. In addition, the crystal oven 202 includes at least a first chamber 204 formed therein. The crystal oven 202 has a generally "U" shaped configuration defined by a first wall 206, a second wall 208, and a trough portion 210 coupling the first wall 206 to the second wall 208. Other configurations and shapes may be used.

At least one non-linear crystal 212 may be disposed in the first chamber 204. The non-linear crystal 212 may be configured to convert incident light at a first wavelength to produce at least one output signal at at least a second wavelength. As an example, the non-linear crystal 212 may comprise a harmonic generation crystal. For example, the non-linear crystal 212 may include, without limitations, second harmonic generation crystals, third harmonic generation crystals, fourth harmonic generation crystals, and the like.

At least one biasing device or member 213 such as a metallic sheet material may be formed around at least a portion of the non-linear crystal 212 between the non-linear crystal 212 and the crystal oven 202. The biasing device 213 may comprise or be formed from ceramics, glass, inorganic foam material, and the like. The biasing device 213 may be configured to provide a biasing force to the non-linear crystal 212 in one or more pre-determined direction. For example, the biasing device 213 may have a portion configured as a leaf spring. As shown, portions of the biasing device 213 may extend through portions of the crystal oven 202 and may extend beyond a periphery of the crystal oven 202. Other configurations may be used.

At least one shape memory alloy (SMA) element 214 may be disposed adjacent the crystal oven 202. As shown, the SMA element 214 may be disposed adjacent the first chamber 204 and may be coupled to a portion of the crystal oven 202. A portion of the SMA element 214 may be coupled to the biasing device 213 such that movement of the SMA element 214 may cause movement of the biasing device 213 and thereby the non-linear crystal 212 positioned therein or proximate thereto. The SMA element 214 is shown having an arcuate shape. However, other shapes and sizes may be used.

At least one positioning body 215 (e.g., hollow cylinder, arcuate body, etc.) may be disposed adjacent the first chamber 204 between the SMA element 214 and the trough portion 210 of the crystal oven 202. As an example, the positioning body 215 may be sized to abut the first wall 206 and the second wall 208 of the crystal oven 202, with a portion of the cylinder 215 extending into the first chamber 204. The positioning body 215 may be formed from glass, ceramic, or metal. However, other materials may be used. In certain embodiments, the positioning body 215 may be configured to operate as a heater (e.g., a source of thermal energy) such as an inductive heater or resistive element.

In operation, a voltage (or heat) may be applied to the SMA element 214, to cause a shape change (e.g., straitening, contraction, etc.) thereof. As the SMA element 214 changes shape, a force is applied to the biasing device 213 via the coupling with the SMA element 214. Since the cylinder 215 abuts the crystal oven 212, further contraction of the SMA element 214 is biased by the positioning body 215 to result in further translation of the force to the biasing device 213. As such, the biasing device 213 can be caused to raise away from the trough portion 210 of the crystal oven 202 causing a positional change to the non-linear crystal 212. Such lifting of the biasing device 213 may be between about 0.5 mm and about 1 mm. However other configurations and translation distances can be used.

Figure 7:
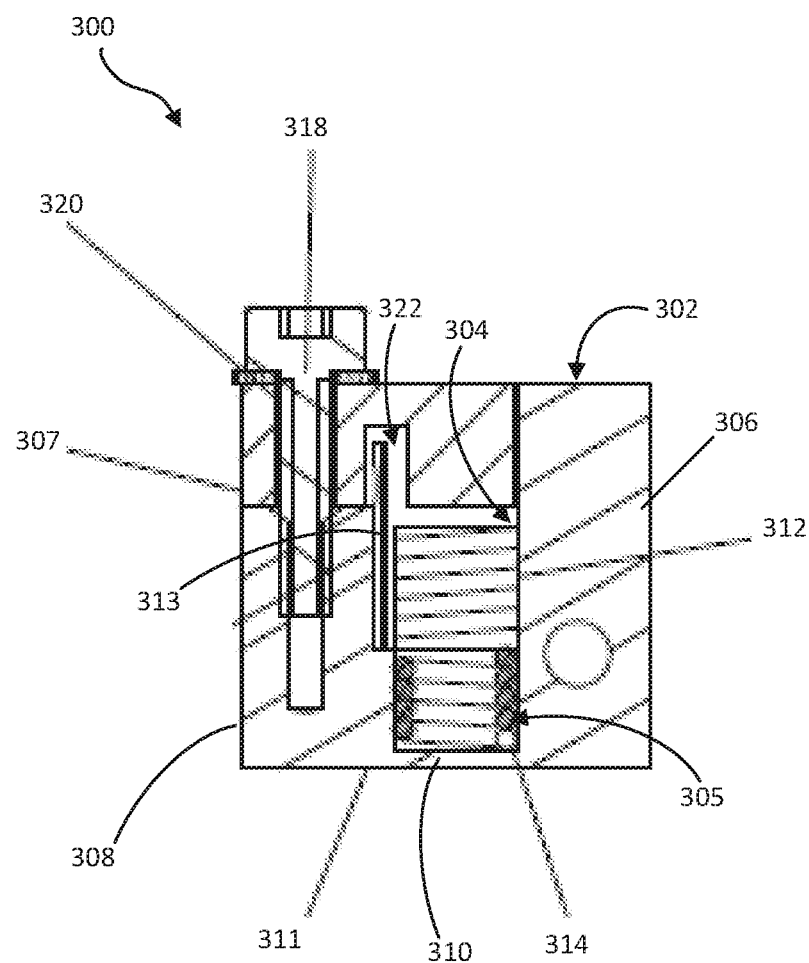
FIG. 7 is a cross-sectional view of a crystal shifter in accordance with another aspect of the present disclosure.
Figure 8:
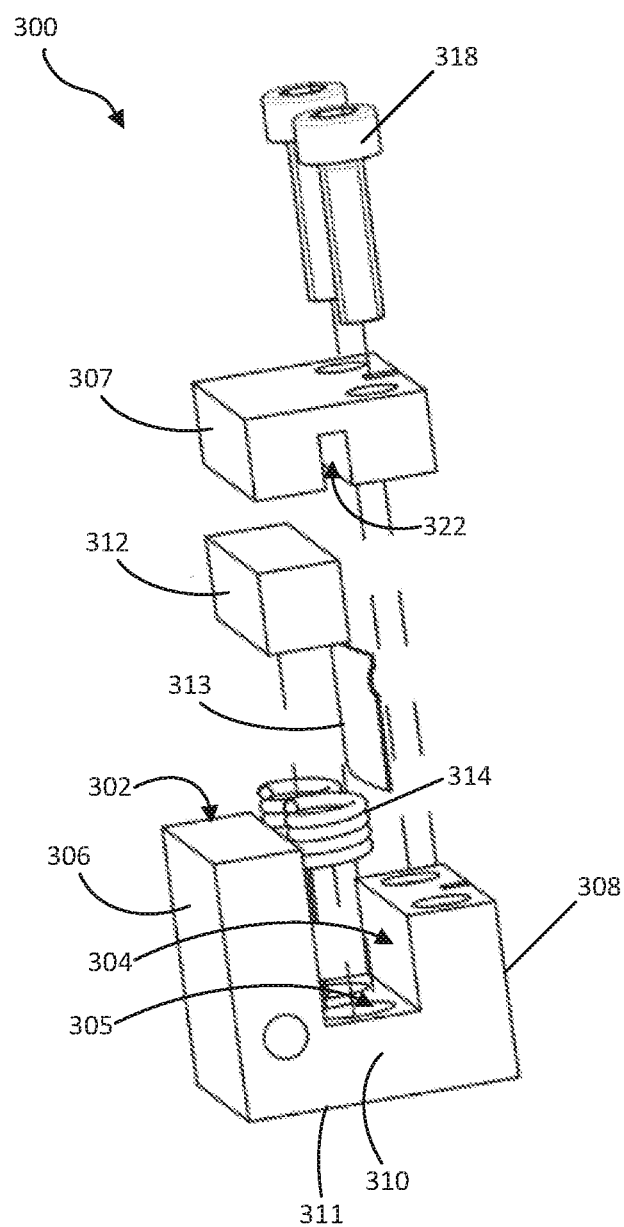
FIG. 8 is a perspective view of the crystal shifter of FIG. 7.
Figure 11:
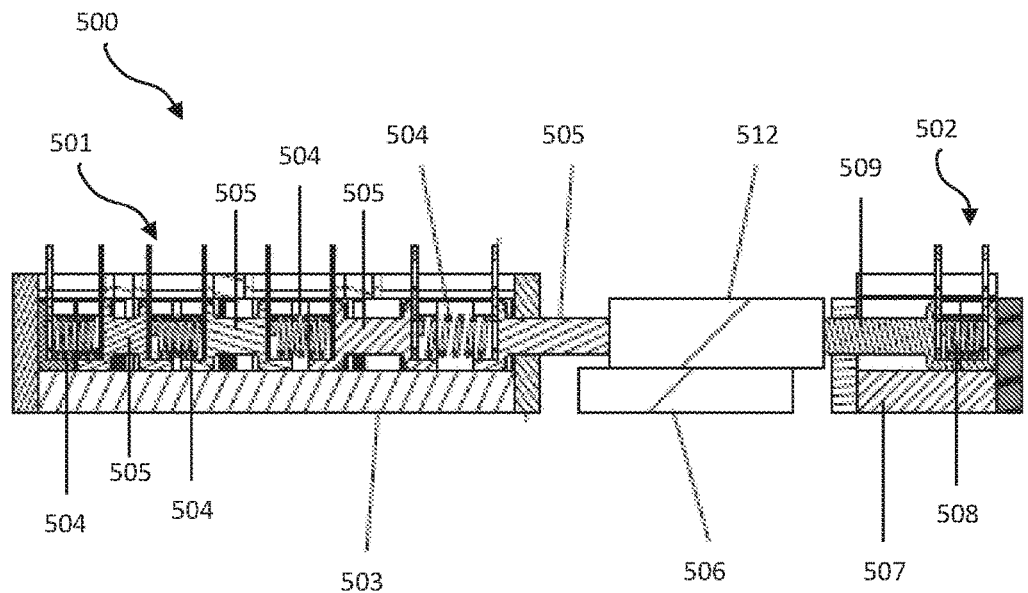
FIG. 11 is a cross-sectional view of a crystal shifter in accordance with another aspect of the present disclosure, shown in a first position.
Figure 12:
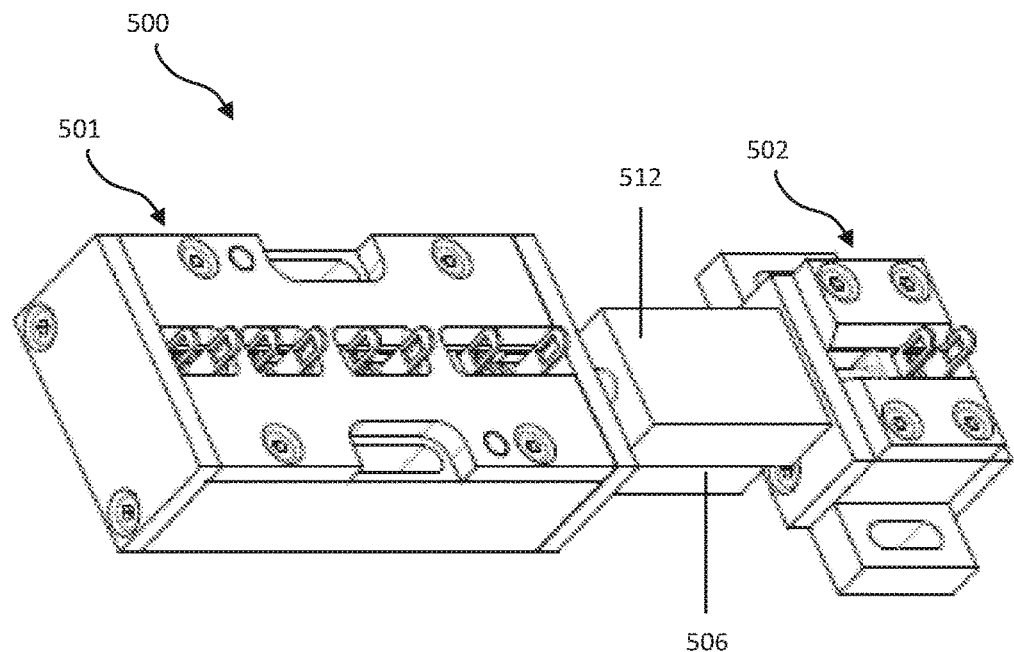
FIG. 12 is a perspective view of the crystal shifter of FIG. 11, shown in the first position.
Figure 13:
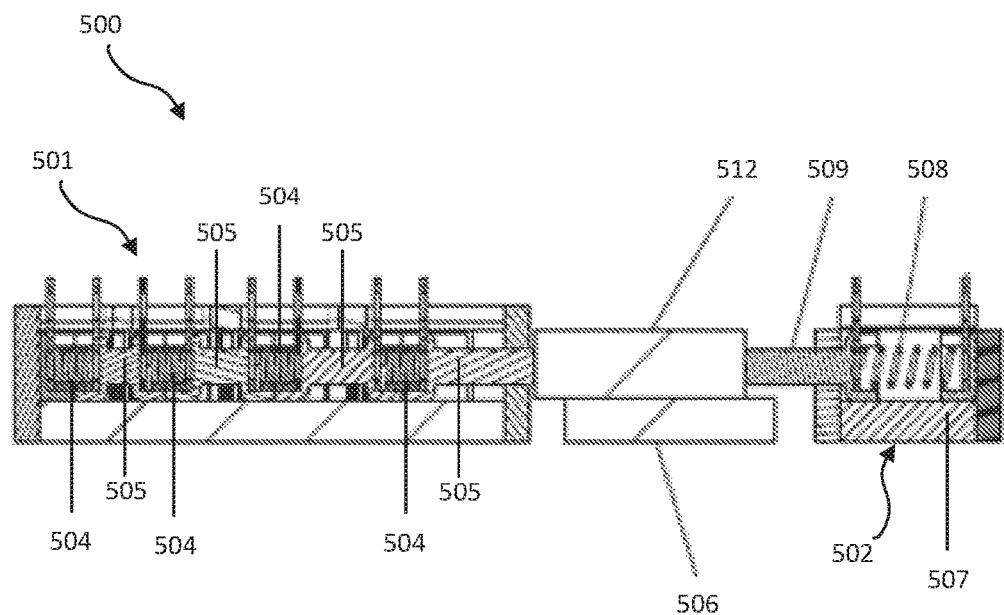
FIG. 13 is a cross-sectional of the crystal shifter of FIG. 11, shown in a second position.
Figure 14:
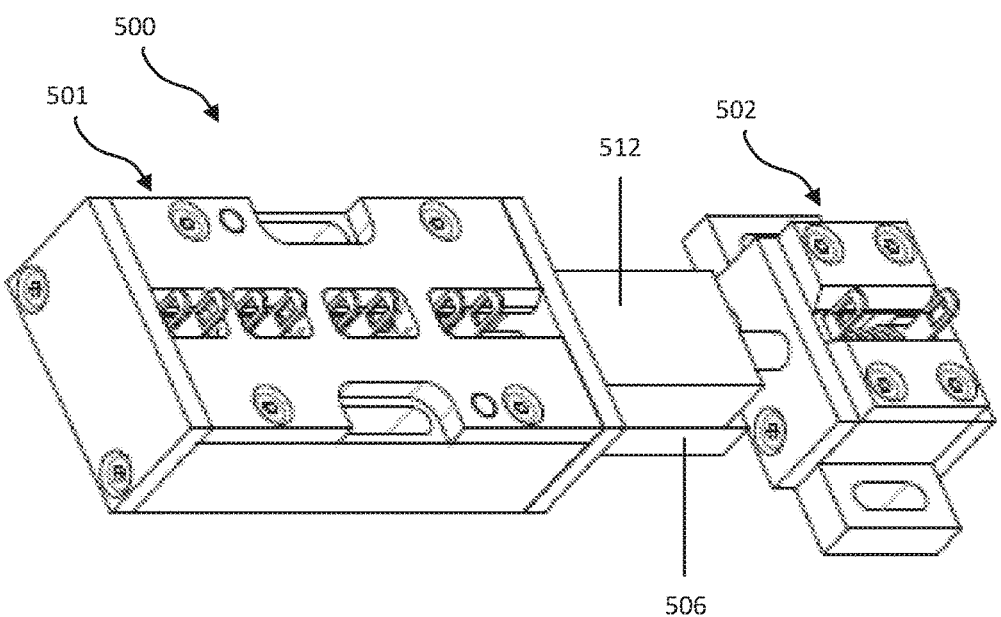
FIG. 14 is a perspective view of the crystal shifter of FIG. 11, shown in the second position.

FIGS. 7-8 illustrate another embodiment of a crystal shifter 300 including at least one housing such as a crystal oven 302 or temperature control mechanism formed therein or attached thereto. As shown the crystal oven 302 includes at least a first chamber 304 formed therein. The crystal oven 302 has a generally "U" shaped configuration defined by a first wall 306, a second wall 308, and a trough portion 310 coupling the first wall 306 to the second wall 308. Other configurations and shapes may be used. The crystal oven 302 may include a second chamber 305 disposed adjacent the first chamber 304. As shown, the second chamber 305 is formed in the trough portion 310 of the crystal oven 302 and the first chamber 304 is defined between the first wall 306 and the second wall 308.

In certain aspects, at least one oven lid 307 may be configured to enclose at least a portion of the first chamber 304. As an example, the oven lid 307 may be coupled to one or more of the first wall 306 and the second wall 308 of the crystal oven 302. As illustrated, one or more couplers 318 (e.g., bolts) may extend through the oven lid 307 and be secured to the crystal oven 302, for example, the second wall 308. As a further example, one or more gaskets 320 (e.g., washer, seal, etc.) may be disposed between at least a portion of the couplers 318 and the oven lid 307.

At least one non-linear crystal 312 may be disposed in the first chamber 304. The non-linear crystal 312 may be capable of converting incident light at a first wavelength to produce at least one output signal at least a second wavelength. As an example, the non-linear crystal 312 may be comprise a harmonic generation crystal, such as a second harmonic generation crystal, third harmonic generation crystal, fourth harmonic generation crystal, sum frequency crystal, and the like. At least one biasing element 313 such as a spring may be disposed adjacent the non-linear crystal 312 to provide a biasing force to the non-linear crystal 312. As an example, the biasing element 313 may be disposed between the non-linear crystal 312 and the second wall 308 to bias the non-linear crystal 312 toward the first wall 306. In certain aspects, the biasing element 313 may extend into a cavity 322 formed in the oven lid 307, which may be aligned with a portion of the first chamber 304 while the oven lid 307 is coupled to the crystal oven 302. Other configurations may be used.

At least one shape memory alloy (SMA) element 314 may be disposed adjacent the non-linear crystal 312. As shown, the SMA element 314 may be disposed in the second chamber 305. A portion of the SMA element 314 may abut the non-linear crystal 312 such that movement of the SMA element 314 may cause movement of the non-linear crystal 312. The SMA element 314 is shown having a coil shape and configured to operate as a pressure spring. However, other shapes and sizes may be used. For example, the SMA element 314 may be configured as a leaf spring (e.g., bent sheet) biasing the non-linear crystal 312 against an opposing bias of a bias element such as a coil spring. As such, the SMA element 314 may change shape to afford more or less bias against the coil spring, thereby controlling a position of the non-linear crystal 312 disposed therebetween.

In operation, a voltage (or heat) may be applied to the SMA element 314, to cause a shape change (e.g., expansion, extension, straitening etc.) thereof. As the SMA element 314 changes shape, the non-linear crystal 312 is caused to move. In the example shown in FIGS. 7-8, an expansion of the SMA element 314 causes the non-linear crystal 312 to move away from a first (bottom) end 311, overcoming friction between the biasing element 313 and the first wall 306. Control of the expansion of the SMA element 314 may allow positional shifting of the non-linear crystal 312 without the need for convention actuators with outgassing organics.

FIGS. 9-10 illustrate another embodiment of a crystal shifter 400 including an outer housing 401 and at least one inner housing 402 such as a crystal oven or temperature control mechanism. The inner housing 402 is disposed within the outer housing 401. The inner housing 402 may be moveable within a cavity 405 defined by the outer housing 401. As an example, one or more biasing elements 403 (e.g., pull springs, tension device, etc.) may be coupled between the inner housing 402 and the outer housing 401 to restrain a movement of the inner housing 402 relative to the outer housing 401.

At least one piston 422 may be disposed in the cavity 405 of the outer housing 401 and may be configured to selectively abut the inner housing 402. The piston 422 may include a piston head 424 and a piston body 426. The piston body 426 may be or comprise a push-spring 427 and may be configured to abut the outer housing 401 to bias the piston head 424 against the inner housing 402 to limit or inhibit motion of the inner housing 402. The piston body 426 may also include at least a first shape memory alloy (SMA) element 414. The first SMA element 414 is shown having a generally linear shape. However, other shapes and size may be used. For example, the first SMA element 414 may be coupled to the outer housing 401 at one end and couple to the piston head 424 at the opposing end. By applying a specific voltage to the first SMA element 414 the first SMA element 414 heats up, contracts, and lifts the piston head 424, thereby allowing the inner housing 402 to move relative to the outer housing 401.

As shown, the inner housing 402 includes at least a first chamber 404 formed therein. The inner housing 402 has a generally "U" shaped configuration defined by a first wall 406, a second wall 408, and a trough portion 410 coupling the first wall 406 to the second wall 408. Other configurations and shapes may be used. In certain aspects, an oven lid 407 may be configured to enclose at least a portion of the first chamber 404. As an example, the oven lid 407 may be coupled to one or more of the first wall 406 and the second wall 408 of the inner housing 402.

At least one non-linear crystal 412 may be disposed in the first chamber 404. The non-linear crystal 412 may be capable of converting the wavelength of at least a portion of incident light. As an example, the non-linear crystal 412 may be configured as a second harmonic generation crystal, third harmonic generation crystal, fourth harmonic generation crystal, sum frequency crystal, and the like. At least one biasing element 413 such as a spring may be disposed adjacent the non-linear crystal 412 to provide a biasing force to the non-linear crystal 412. As an example, the biasing element 413 may be disposed between the non-linear crystal 412 and the first wall 406 to bias the non-linear crystal 412 toward the second wall 408. Other configurations may be used.

An outer surface 415 of the second wall 408 of the inner housing 402 may include one or more slide features 416 configured to be engaged by one or more tappets 417. As shown, the slide feature 416 has a sawtooth shape. However, other shapes may be used. The outer surface 415 of the second wall 408 may be disposed adjacent an inner surface 418 of the outer housing 401 and configured to slideably engage the inner surface 418. The tappet 417 may be disposed adjacent the slide feature 416, whereby the tappet 417 may slideably engage the slide feature 416. A second SMA element 419 may be coupled to the tappet 417 and the outer housing 401. At least one biasing element 420, such as a pull-spring, may be coupled to the tappet 417 and the outer housing 401 to provide a bias against the second SMA element 419. By applying a specific voltage to the second SMA element 419 the second SMA element 419 heats up, contracts, and moves the tappet 417. The tappet 417 engages the slide feature 416 to cause the inner housing 402 to move. By removing the voltage applied to the first SMA element 414 the piston 422 is biased against the inner housing 402 to fix the inner housing 402 into position. By removing the voltage applied to the second SMA element 419, the tappet 417 is biased toward the biasing element 420 due to the saw tooth profile of the slide feature 416. By reiteration the inner housing 402 can be shifted into other positions. Various combinations of SMA actuators and counterforce springs may be used to provide additional control over the inner housing 402. Moreover, the inner housing 402 may be configured in a similar manner as the crystal ovens 102, 202, 302, as described herein.

FIGS. 11-14 illustrate another embodiment of a crystal shifter 500 including a first shifting apparatus 501 and at least a second shifting apparatus 502. The first shifting apparatus 501 may include a housing 503 and one or more SMA elements 504 disposed in the housing. The SMA elements 504 may be thermally and electrically isolated from the housing 503 and each other by a plurality of plungers 505, for example ceramic plungers. Other elements such as a spacers and plates may be used to isolate the SMA elements 504. Such isolating elements may comprise glass, inorganic materials, and/or other isolating materials. One of the plungers 505 may extend outside the housing 503 and may engage at least one slider 512 to cause motion of the slider 512 relative to a base plate 506, whereby slider 512 and base plate 506 form at least part of a translation stage.

In operation, one or more of the SMA elements 504 may be heated by external heaters or by applying a specific voltage and current to the SMA elements 504. As an example, the expansion distance 'x' may be limited mechanically so that a first one of the SMA elements 504 shifts by 'x' mm (e.g., 0.5 mm), a second one of the SMA elements 504 shifts by 2× mm (e.g., 1 mm), a third one of the SMA elements 504 shifts by 4× mm (e.g., 2 mm), and so on. As a further example, the first shifting apparatus 501 can be configured to shift based on the number 'n' of SMA elements 504 following a shift formula of $2^{(n-1)} \times$ mm for the nth SMA element. All SMA elements 504 together may allow $2^n$ steps from 0 mm to $(2^n-1)x$ mm, where n is the number of actuators and x is the step size (e.g., from 0 mm to 7.5 mm in 0.5 mm steps). Other configurations may be used.

The second shifting apparatus 502 may include a housing 507 and one or more SMA elements 508 disposed in the housing. The SMA elements 508 may be thermally and electrically isolated from the housing 507 base and each other by a plurality of plungers 509, for example ceramic plungers. Other elements such as a spacers and plates may be used to isolate the SMA elements 508. One of the plungers 509 may extend outside the housing 507 and may engage the slider 512 to cause motion of the slider 512 relative to the base plate 506 as a counter motion to the motion caused by the plungers 505 of the first shifting apparatus 501.

In operation, one or more of the SMA elements 508 may be heated by external heaters or by applying a specific voltage and current to the SMA elements 508. As an example, the expansion distance 'x' may be limited mechanically so that a first one of the SMA elements 508 shifts by 'x' mm (e.g., 0.5 mm), a second one of the SMA elements 508 shifts by 2× mm (e.g., 1 mm), a third one of the SMA elements 508 shifts by 4× mm (e.g., 2 mm), and so on. As a further example, the second shifting apparatus 502 can be configured to shift based on the number 'n' of SMA elements 508 following a shift formula of $2^{(n-1)} \times$ mm. All SMA elements 508 together may allow $2^n$ steps from 0 mm to $(2^n-1)x$ mm, where n is the number of actuators and x is the step size (e.g., from 0 mm to 7.5 mm in 0.5 mm steps). As an example, shifting apparatus 501 sets positions 0.5 mm to 7.5 mm in 0.5 mm steps and shifting apparatus 502 can be configured to sets position 0 mm (zeroing) from any position. However, other configurations may be used. As such, the SMA elements 504, 508 may be selectively actuated in order to control a stepped shift in a bi-directional manner. Other configurations may be used. Furthermore, the plungers 505, 509 may be configured to engage the slider 512 having an optical element disposed thereof. As such, movement of the slider 512 results in movement of the optical element, such as a non-linear crystal. As a further example, the optical element disposed on the slider 512 may be or include one or more crystal shifters similar to crystal shifters 100, 200, 300, to facilitate two dimensions crystal shifting.

INDUSTRIAL APPLICABILITY

The present disclosure is applicable to laser systems using a optical element (e.g., non-linear crystal) to cause wavelength conversion (frequency conversion) of at least a portion of laser light. In particular, the crystal shifters 100, 200, 300, 400, 500 disclosed herein may be used to support and position one or more optical elements. In particular, the crystal shifters 100, 200, 300, 400, 500 disclosed herein may include SMA actuators that include are inorganic, non-outgassing materials and thus, can be used close to the nonlinear crystal. SMA actuators are powerful actuators applying strong forces and requiring less space. SMA actuators can be heated up by an external heat source or by applying electrical voltage and current to the SMA elements of the actuators. Furthermore, crystal shifters using SMA actuators can be low cost. Although the term crystal shifter is used herein to reference the various shifting apparatus, it is understood that other optical elements may be supported and positioned in the same way. Such optical elements may include optical materials (e.g., crystals, periodically poled materials (e.g., periodically poled lithium niobate) and/or optical components, or devices, including, without limitations, waveguides, optical lenses, mirrors, gratings, waveguides, attenuators, filters, non-linear optical materials, optical crystals, beam splitters, bulk optical materials, gain media and devices, detectors, and the like.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A system comprising:
    an outer housing defining a first chamber;
    an inner housing disposed in the first chamber, the inner housing defining a second chamber;
    at least one non-linear crystal disposed in the second chamber, the non-linear crystal configured to receive incident light and to convert a wavelength of at least a portion of the incident light;
    at least one piston disposed between the outer housing and the inner housing to limit movement of the inner housing relative to the outer housing, wherein the piston is configured to be actuated to allow movement of the inner housing relative to the outer housing; and
    at least one shape memory alloy element in mechanical contact with the inner housing, wherein thermal or electrical energy applied to the shape memory alloy causes movement of the inner housing.

2. The system of claim 1, wherein the inner housing is a crystal oven configured to control a thermal environment of the non-linear crystal.

3. The system of claim 1, wherein the piston comprises a piston body coupled to a piston head, and wherein at least a portion of the piston body is formed from a shape memory alloy.

4. The system of claim 3, wherein the piston body comprises a spring configured to bias the piston head toward the inner housing.

5. The system of claim 1, wherein a surface of the inner housing comprises at least one slide feature configured to be engaged by a tappet, and wherein the tappet facilities the mechanical contact between the shape memory alloy element and the inner housing.

6. The system of claim 5, wherein the slide feature comprises a sawtooth shape.

* * * * *